Oct. 9, 1928.

L. O. GRONDAHL 1,687,017

APPARATUS FOR CAUSING INTERMITTENT OPERATION
OF ELECTRORESPONSIVE DEVICES

Filed Sept. 27, 1922    2 Sheets-Sheet 1

INVENTOR:
L. O. Grondahl,
BY
A. L. Vencill
His ATTORNEY

Oct. 9, 1928.

L. O. GRONDAHL 1,687,017

APPARATUS FOR CAUSING INTERMITTENT OPERATION
OF ELECTRORESPONSIVE DEVICES

Filed Sept. 27, 1922    2 Sheets-Sheet 2

INVENTOR:
L. O. Grondahl,
BY A. L. Vencill
His ATTORNEY

Patented Oct. 9, 1928.

1,687,017

UNITED STATES PATENT OFFICE.

LARS O. GRONDAHL, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

APPARATUS FOR CAUSING INTERMITTENT OPERATION OF ELECTRORESPONSIVE DEVICES.

Application filed September 27, 1922. Serial No. 590,855.

My invention relates to apparatus for causing intermittent operation of electro-responsive devices, such as electric lamps. Apparatus embodying my invention is well adapted for causing the flashing operation of the lamps in electric signs and highway crossing signals, although the invention is not limited to the control of electric lamps, or to the control of lamps which are used for the two specified purposes.

The present application is in part a continuation of my copending application filed Sept. 24, 1921, Serial No. 503,038, abandoned Oct. 30, 1922, for apparatus for causing intermittent operation of electro-responsive devices, in so far as the subject matter common to the two is concerned.

I will describe several forms of apparatus embodying my invention, and will then point out the novel features thereof in claim.

Figure 1:
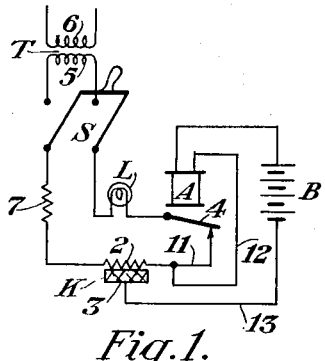
Figure 2:
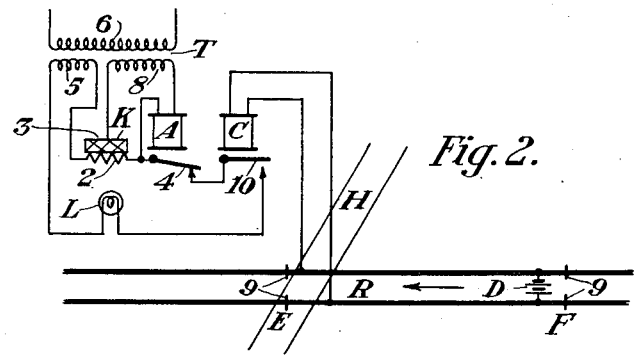
Figure 3:
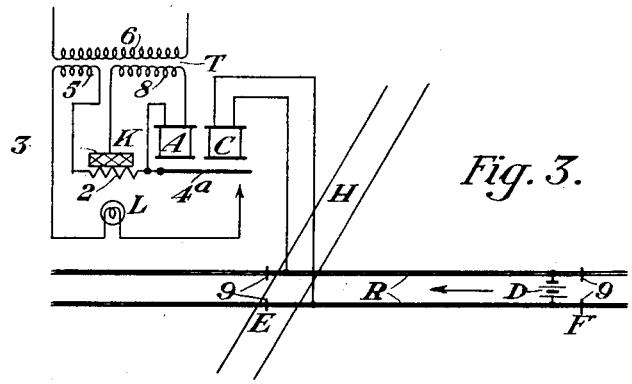
Figure 4:
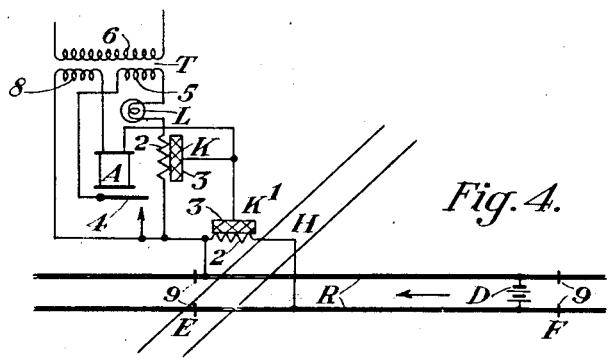
Figure 5:
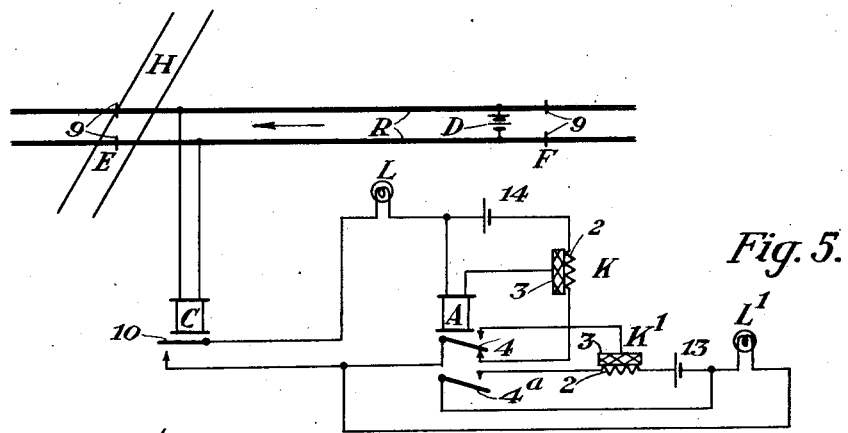
Figure 6:
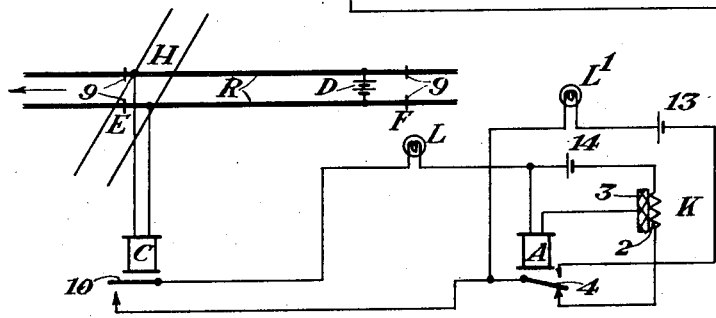
Figure 7:
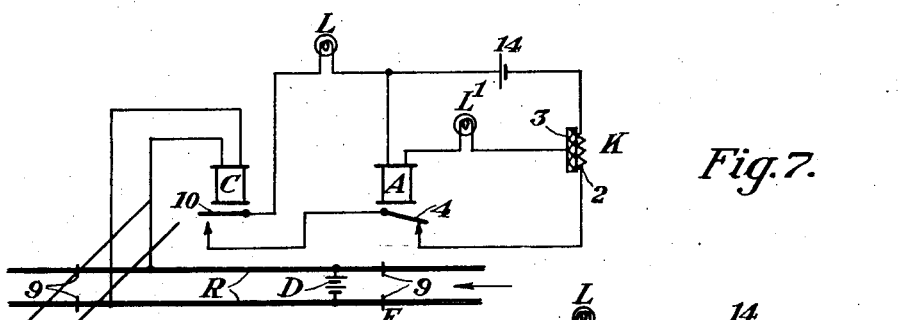
Figure 8:
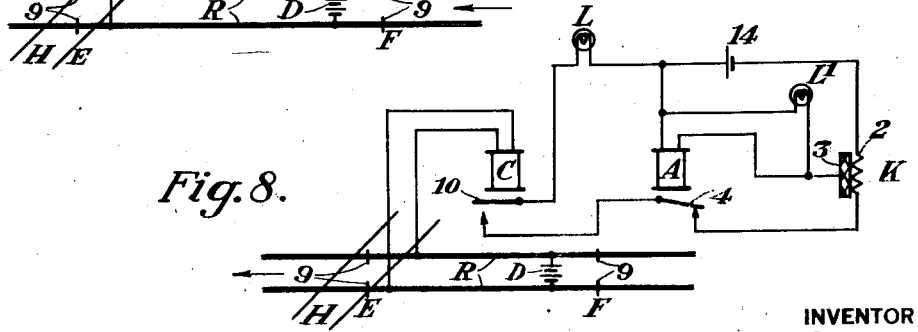

In the accompanying drawings, Fig. 1 is a diagrammatic view showing one form of apparatus embodying my invention adapted for causing the flashing operation of a lamp in an electric sign. Fig. 2 is a view showing a modified form of apparatus adapted for the control of a lamp in a highway crossing signal and also embodying my invention. Figs. 3 and 4 are views showing other arrangements of highway crossing signal controlling apparatus also embodying my invention. Fig. 5 is a view showing diagrammatically, an arrangement for highway crossing signals comprising two lamps and also embodying my invention. Fig. 6 is a modification of the apparatus shown in Fig. 5 and also embodying my invention. Figs. 7 and 8 are views showing apparatus also embodying my invention, accomplishing the same result as that of Fig. 6, but without the use of front contacts on the controlling relay.

Similar reference characters refer to similar parts in each of the several views.

Referring first to Fig. 1, the reference character L designates an electric lamp which I will assume is one of the lamps of an electric sign. This lamp is controlled in part by a thermo-sensitive relay K having a heating element 2 and a thermo-sensitive element 3, which elements are in mutual electrical contact and are also so associated that the thermo-sensitive element is subjected to variations in the temperature of the heating element due to the presence and absence of current in the latter. The lamp is further controlled by a relay A of the electro-magnetic type having a back contact 4. Lamp L is supplied with current from the secondary 5 of a transformer T, the primary 6 of which is connected with a suitable source of alternating current not shown in the drawing.

The circuit for lamp L is from the left-hand terminal of secondary 5, through a hand switch S, ballast resistance 7, heating element 2 of relay K, wire 11, back contact 4 of relay A, lamp L, and switch S, to the right-hand terminal of secondary 5. The relay A is provided with a circuit which passes from a battery B, through the winding of relay A, wire 12, the thermo-sensitive element of relay K, and wire 13 to battery B.

The operation of the apparatus shown in Fig. 1, is as follows:

As shown in the drawing, the switch S is open, so that lamp L is, of course, de-energized and the same thing is true of the heating element 2 of relay K. The thermo-sensitive element of this relay has a negative temperature coefficient, so that when the relay is de-energized, that is, when the thermo-sensitive element is cool, the resistance of this element is high; the parts are so adjusted that under this condition the current supplied to relay A by battery B is not sufficient to close this relay, and so the back contact 4 is closed. When switch S is closed, current will, of course, be supplied to lamp L, so that this lamp will become lighted. Current will simultaneously be supplied to the heating element 2 of relay K, and as soon as the temperature of the thermo-sensitive element 3 rises to a certain value, the current supplied to relay A will become sufficient to close this relay, thereby opening the back contact 4, and this will de-energize lamp L and heating element 2, so that the lamp will again be extinguished. Relay K will then cool, and when its resistance has reached a certain value, relay A will again open, thereby re-closing the circuit for lamp L and heating element 2, so that the cycle of operation will be repeated.

The frequency of operation of the lamp L can be varied by varying the proportions of the parts of the circuit, and by varying the design of the thermo-sensitive relay K.

Referring now to Fig. 2, the reference character R designates the track rails of a railway along which traffic normally moves in the direction indicated by the arrow, and the reference character H designates a highway intersecting the railway track. Located at the intersection of the railway and the highway is a highway crossing signal comprising a lamp L. This signal is controlled by a track circuit comprising a track battery D and a track relay C, which elements are connected across the rails R at the entrance and exit ends of a track section E—F which is isolated from the adjacent rails by insulated joints 9. The circuit for lamp L is from the left-hand terminal of transformer secondary 5, through lamp L, back contact 10 of track relay C, back contact 4 of relay A, and heating element 2 of thermo-sensitive relay K to the right-hand terminal of secondary 5. The circuit for relay A passes from the left-hand terminal of transformer secondary 8, through the thermo-sensitive element 3 of relay K and winding of relay A to the right hand terminal of secondary 8.

The operation of the apparatus shown in Fig. 2 is as follows:

When the track section E—F is unoccupied, track relay C is closed, so that the circuit for lamp L and heating element 2 is open at contact 10 of this relay. Relay A is then open, because of the high resistance of element 3 of relay K. When a car or train enters the section E—F, however, relay C opens, thereby closing contact 10, so that lamp L becomes lighted. Heating element 2 is simultaneously energized, so that after a predetermined interval of time relay A closes, thereby opening at contact 4 the circuit for lamp L and heating element 2. As soon as relay K cools, relay A again opens, and the cycle is repeated. It follows, that lamp L is intermittently lighted as long as track relay C is de-energized, that is, as long as any part of the car or train occupies the track section E—F. It will be seen, therefore, that the highway crossing signal gives a flashing indication, the periodicity of which may be varied by suitable variations in the design of relay K and in the proportioning of the parts of the circuits with which this relay is associated.

In Fig. 3, the apparatus is the same as that shown in Fig. 2, except that the magnets of the two relays A and C are provided with a common armature 4ᵃ, which armature is closed whenever either relay magnet is energized. As shown in the drawing, the track section E—F is unoccupied, so that contact 4ᵃ is open and the lamp L is, therefore, extinguished. When a train enters the track section contact 4ᵃ will close, because relay magnet C becomes de-energized and relay magnet A is already de-energized. Lamp L will, therefore, become lighted and will remain lighted until relay magnet A becomes effectively energized, whereupon contact 4ᵃ will open and so will extinguish the lamp. As soon as relay K has cooled to the necessary point, relay magnet A will release the armature 4ᵃ, so that the lamp L will again become lighted. The operation will, of course, be repeated until the entire car or train passes out of section E—F.

Referring now to Fig. 4, the track relay C is replaced by a relay K' of the thermo-sensitive type, the heating element 2 of which is connected across the rails at the exit end of section E—F. The circuit for lamp L is the same as in Fig. 2, that is, it includes heating element 2 of relay K and back contact 4 of relay A. The circuit for relay A is also the same as in Fig. 2, in that it includes the thermo-sensitive element 3 of relay K. The circuit for relay A is provided with a branch around the thermo-sensitive element 3 of relay K, which branch includes the thermo-sensitive element 3 of relay K'.

The operation of the apparatus shown in Fig. 4 is as follows:

As long as section E—F is unoccupied, relay K' is energized, so that the resistance of element 3 of this relay is low, and consequently relay A is closed. Back contact 4 is then open, so that lamp L is extinguished. When a train enters section E—F, the supply of current to the heating element 2 of relay K' is discontinued, so that this relay becomes cool and its resistance consequently becomes high, so that relay A opens. The closing of the back contact 4 closes the circuit for lamp L and heating element 2 of relay K, so that lamp L becomes lighted. As soon as relay K becomes heated to a certain temperature, the resistance of the main circuit for relay A is reduced to a sufficient amount to permit this relay to close, and the consequent opening of back contact 4 extinguishes lamp L and de-energizes element 2 of relay K. The operation is repeated until the car or train passes out of section E—F, whereupon relay K' again becomes energized and maintains relay A in the closed position, so that lamp L is extinguished.

In Fig. 5 is shown an arrangement for alternately lighting two lamps L and L'. The circuit for lamp L is from a battery 14, through the heating element 2 of a thermo-sensitive relay K, a back contact 4 of a relay A, back contact 10 of a track relay C and the lamp L back to the battery 14. The circuit for the winding of relay A is from the battery 14, through the thermo-sensitive element of the relay K and the winding of the relay A back to the battery 14. The circuit for lamp L' is from a battery 13, through the lamp, front point of contact 4 on the relay A, and thermo-sensitive element 3 of a second thermo-sensitive relay K' back to the battery 13. The heating element 2 of the relay K' is in a circuit from the battery 13 through a front contact 4ª on the relay A, and the said heating element 2 to the battery 13.

The operation of the apparatus shown in Fig. 5, is as follows:

When a train enters the track section E—F approaching the crossing H, the winding of the relay C, supplied from a track battery D, is short circuited by the car axles, so that the relay is de-energized and the back contact 10 closes. This closes the circuit for lamp L and the relay K so that the lamp becomes lighted and the relay K becomes energized allowing current to flow through the winding of the relay A. When the relay A becomes energized its back contact opens and its two front contacts close. The lamp L is therefore extinguished and the heating element 2 of the relay K is de-energized. As soon as the thermo-sensitive element cools, the relay A is de-energized, and the cycle of operations is repeated. The closing of the two front contacts of the relay A allows current to flow from the battery 13 through the heater of the relay K'. When this relay reaches a certain temperature, current flows through L' sufficient to light it, while, when the thermo-sensitive element is cool, not enough current flows through it to light the lamp. Therefore, during the first part of the period of energization of the relay K, both lamp L and lamp L' are dark, and during the rest of the period, after the relay K' becomes heated, the lamp L' is lighted and lamp L is extinguished. As soon as the relay A is de-energized, the lamp L' is extinguished, and the lamp L is lighted.

The frequency of operation of this cycle and the periods of the three intervals may be varied by adjustment of the various elements of the thermo-sensitive relays and the relation between characteristics of relays K, K' and A.

Referring now to Fig. 6, the apparatus is the same as that shown in Fig. 5 except that the thermo-sensitive relay K' is omitted and the circuit for lamp L' is from the battery 13, through the front point of contact 4 on the relay A, and the lamp L' to the battery 13. This connection requires only one front contact and one back contact on the relay A, but results in the omission of the interval of time when both lamps are dark. The operation of the apparatus shown in Fig. 6 is as follows:

The entrance of a train in the block E—F operates to de-energize the relay C, closing its back contact and allowing current from the battery 14 to flow through the lamp L and the heating element of relay K, lighting the lamp L and energizing relay K. As soon as this relay K becomes heated, it causes relay A to close, thus extinguishing the lamp L and de-energizing the heater element of the relay K. But when the front point of contact 4 closes, the circuit is closed through the lamp L', so that this lamp immediately becomes lighted. When the relay K cools, the relay A becomes de-energized, and the cycle of operations is repeated.

The frequency of the cycle and the relative lengths of time consumed by each part may be regulated by adjustment of the various elements of the thermo-sensitive relay K and the electro-magnetic relay A.

In Fig. 7, I accomplish the same result as in Fig. 6 without the front contact on the relay A and the battery 13, and I do this by inserting the lamp L' in series with the thermo-sensitive element of the relay K and the winding of the relay A. The rest of the apparatus and connections are the same as in Fig. 6, and the operations of the apparatus in Fig. 7 is as follows:

When the relay C is de-energized by a train passing into the block E—F, its back contact is closed, completing the circuit through the lamp L and the heater 2 of the relay K, lighting this lamp and energizing the relay. When relay K has reached its operating temperature, it lights lamp L' and energizes relay A, whereupon relay K and lamp L are de-energized due to the opening of contact 4. As soon as the relay K cools the relay A is de-energized, its back contact closes, lamp L' is extinguished, lamp L is lighted and the cycle is repeated as long as the relay C is de-energized.

In Fig. 8, the apparatus and the operation are identical to Fig. 7 except that the lamp L' is connected in parallel with the winding of the relay A instead of in series therewith.

Although I have herein shown and described only a few forms of apparatus embodying my invention, it is understood that various changes and modifications may be made therein within the scope of the appended claim without departing from the spirit and scope of my invention.

Having thus described my invention, what I claim is:

In combination two electric lamps, an electromagnetic relay having front and back contacts; a circuit including a source of current, the first lamp, a back contact of said relay and the heating element of a thermo-sensitive device; a circuit for said relay including a source of current and the thermo-sensitive element of said device; a second thermo-sensitive device; a circuit for the heating element of said second device including a source of current and a front contact of said relay; and a circuit including said second lamp, a source of current, the thermo-sensitive element of said second device, and a second front contact of said relay; whereby a time interval occurs between the extinguishing of the first lamp and the lighting of the second lamp, which time interval is determined by the characteristics of the second thermo-sensitive device.

In testimony whereof I affix my signature.

LARS O. GRONDAHL.